H. D. TAYLOR.
SHORT BASE RANGE FINDER.
APPLICATION FILED APR. 28, 1919.

1,421,321.

Patented June 27, 1922.
2 SHEETS—SHEET 1.

Fig. 1ª

Inventor
Harold D. Taylor
by Sturtevant & Mason
attorneys.

H. D. TAYLOR.
SHORT BASE RANGE FINDER.
APPLICATION FILED APR. 28, 1919.

1,421,321.

Patented June 27, 1922.
2 SHEETS—SHEET 2.

Witnesses
H. W. Duvall
R. J. Linotti

Inventor
Harold D. Taylor
By Sturtevant & Mason
Attorneys

UNITED STATES PATENT OFFICE.

HAROLD DENNIS TAYLOR, OF BISHOPSHILL, ENGLAND, ASSIGNOR OF ONE-HALF TO ALFRED TAYLOR, OF BISHOPSHILL, YORK, ENGLAND.

SHORT-BASE RANGE FINDER.

1,421,321.   Specification of Letters Patent.   Patented June 27, 1922.

Application filed April 28, 1919. Serial No. 293,289.

(GRANTED UNDER THE PROVISIONS OF THE ACT OF MARCH 3, 1921, 41 STAT. L., 1313.)

*To all whom it may concern:*

Be it known that I, HAROLD DENNIS TAYLOR, subject of the King of Great Britain, residing at Bishopshill, in the county of York and Kingdom of England, have invented certain new and useful Improvements in and Relating to Short-Base Range Finders (for which I have filed an application in England April 18, 1918, Patent No. 125,-725), of which the following is a specification.

The present invention relates to improvements in home base range finders of the type in which two optical squares, one at each end of a tube reflect a view of the distant target towards the middle of the tube into a single or double observing telescope.

The invention however will not be generally applicable to range finders where the two end optical squares both reflect off in the same direction, the one over or under the other, into one telescope, because in this case the simple operation of the halving adjustment means always secures that the main axes of the two optical squares are parallel.

Under certain conditions it is possible for the optical squares of range finders to be mal-adjusted or become maladjusted with resultant errors in the determining of a range of a remote object by the instrument without the observer becoming aware of the fact.

Accordingly by the present invention there is provided, preferably adjacent to the normal viewing eyepiece of the instrument, the eyepiece of a collimating telescope in the optical system of which telescope is situated a collimating line, which can be viewed by the eyepiece directly and indirectly by reflection in a small mirror on the optical square so that any tilting of the optical square will be immediately apparent by a lack of coincidence of the two images of the said collimating line, or a movement of one line relatively to the other as the case may be.

With such short base range finders it can be shown that as long as the main axis of the optical squares are upright or perpendicular to the plane of the range triangle, that is the plane containing the base or the longitudinal axis of the instrument and the distant object so long do they reflect the reflected ray at the minimum angle with the entering ray this minimum angle being usually arranged to be approximately a right angle. By the main axis of an optical square is here meant the straight line formed by the intersection of the two reflecting mirrors or planes or any straight line parallel to the same. Further the longitudinal axis of an optical square is the straight line which, in plan, bisects the angle (of 45°) between the two mirrors and lies in the plane of reflection or the plane of the range triangle, or any straight line parallel to the optical squares' longitudinal axis.

In practice the main axes of the optical squares are set upright in a finished range finder by rocking each optical square about its longitudinal axis by 10 minutes of arc in either direction and seeing that it gives equal range readings when in either extreme position and adjusting it to do so. There are also two other axes of an optical square to be considered, one being the first secondary axis pointing to the distant target and the other or second secondary axis is the axis of the main tube along which the rays reflected from the target pass to the central telescope or telescopes.

It can be shown that if the right hand optical square becomes tilted or rotates about its first secondary axis, away from its truly upright position, then the object as seen in the erecting telescope will move to the left slightly in accordance with the following table.

| Angle of tilt about first secondary axis. | Deviation of image to left. |
|---|---|
| 5.3 minutes. | .5 seconds. |
| 7.5 " | 1.0 " |
| 10.6 " | 2.0 " |
| 15 " | 4.0 " |

Similarly if the left hand optical square likewise tilts about its first secondary axis then the object reflected from it will be seen to move towards the right in the erecting telescope, so that if the two images coincided in the telescopic field before the tilting took place, then after both optical squares have tilted away from one another, for example by 7½ minutes of arc for each optical square, then the two images will become separated by 2 seconds of arc and a wrong range reading will be registered: supposing that no means be provided for restoring both optical squares to verticality.

It can be shown that if the halving line of a range finder be made to bisect in the field of view, a certain point on a distant upright mast and then the two optical squares become equally tilted about their first secondary axes, the upper ends of their main axes both leaning away from the centre of the instrument, then both the images will drop by equal amounts in the field of view so that if there was vertical coincidence or freedom from halving error when the optical squares were upright, there will still be vertical coincidence or freedom from halving error after the equal tiltings of the optical squares have taken place, therefore the observer is left with no indication whatever of the fact that the optical squares have gone out of upright, so that his range readings may be more or less vitiated without his suspecting any error.

This actually may take place when warm sunshine is allowed to fall on the top of the range finder, causing the top half of the tube to expand relatively to the lower half, which naturally causes the two optical squares to tilt away from one another and by an angular amount which may be expected to vary with the length of the instrument, so that doubling the latter, should be expected to quadruple the optical errors and so on.

Not only are the main tubes liable to buckle because heated unequally on top and bottom sides, but in many cases they buckle or deviate from straightness under changes of temperature quite apart from unequal heating. A tube may be perfectly straight at a uniform temperature of 75 degrees and yet buckle at 35 degrees.

It is the object of my invention to enable the observer to keep a check upon the uprightness of the two optical squares by means of a very simple observation and adjustment, which latter works in with the adjustment for halving error that is always provided with a range finder.

The invention is more particularly described with reference to the accompanying drawing diagrammatically showing one arrangement by way of example, and in which:—

Fig. 1 is a diagrammatic view of part of a range finder.

Fig. 1ª is a side view of the roof prism of Fig. 1.

At a place conveniently close-by the eyepiece 18 of the observer or range-taker, the eyepiece 1 of a small self collimating telescope is mounted which, a little way inside the main tube is elbowed and has a reflecting prism, preferably an erecting or roof prism 2 mounted in the elbow and reflecting off in a direction towards the right hand optical square 19 in the arrangement shown, and parallel to the base line 21 of the range finder.

Figure 4:
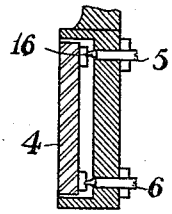
Figures 4 and 5 are details showing the mounting of the mirror.
Figure 5:
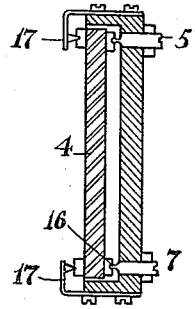
Figure 6:
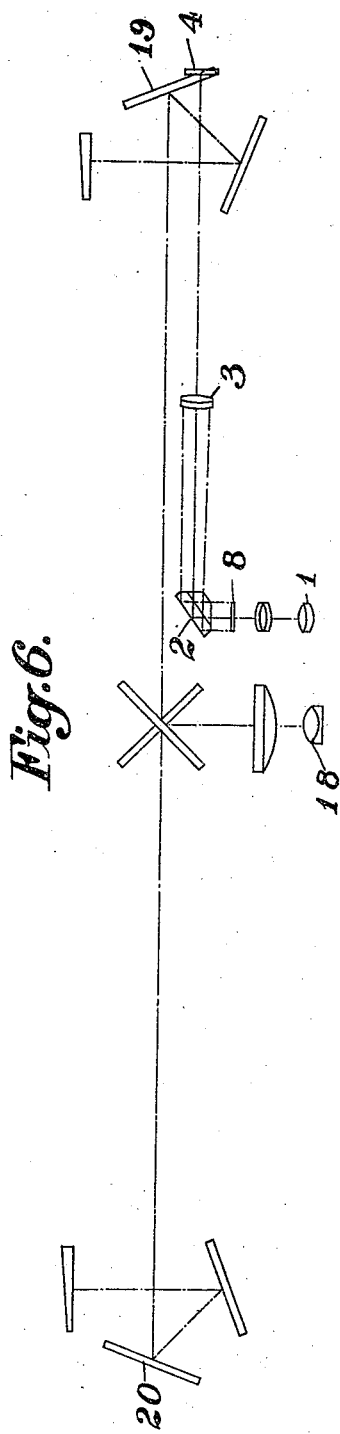
Fig. 6 shows the collimating system in relation to a range finder.

A small telescope objective 3 carried either by a tube or bracket is mounted at its principal focal distance from the eyepiece focal plane, so that the whole forms an elbowed telescope (whose magnifying power should be about 10 to 15 diameters) directed towards a part of the frame work of one or the other of the two optical squares 19, 20 (or in certain cases each alternately if desired) and to this latter frame work a silvered plane mirror 4, Figures 4 and 5, of upright rectangular form (say about 2″ to 3″ high by 1″ wide) is fixed with three adjustable 5, 6, 7 bearings so that it can be fixed in a plane perpendicular to the projected line of collimation of the said elbowed telescope.

Figure 1:
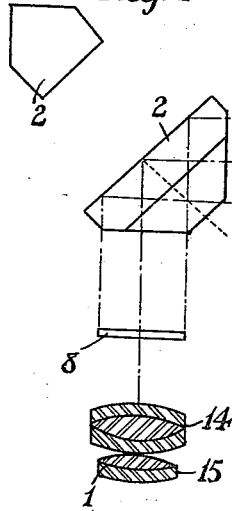
Figure 2:
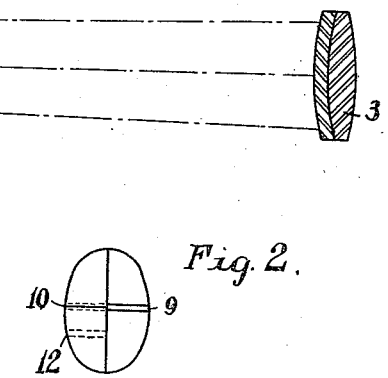
Fig 2 is a front view of the collimating eyepiece diaphragm.
Figure 3:
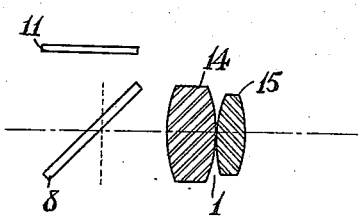
Fig. 3 is a corresponding vertical longitudinal section.

In the focal plane of the collimating telescope is placed a diaphragm 8, Figs. 1 and 3 of plane unsilvered glass placed at an angle (generally 45°) with the optic axis and this has a horizontal silvered line 9, see Fig. 2 on it of about .02 inch width stretching across from one edge to the centre of the diaphragm and continuous with its centre is an opaque black line 10 about .005 width drawn across the other half of the diaphragm. The silvered line is arranged to be on the eyepiece side of the glass so as to reflect as a bright line towards the objective by internal reflection.

Somewhere just above the diaphragm is placed a disc or window 11 Fig. 3 of ground or opal glass illuminated either by the sky or by a small electric lamp. This supplies a back-ground of light for the illumination of the diaphragm 8.

Let it be supposed that the telescope is fixed to look towards the right hand optical square frame, which carries the adjustable mirror as shown. In the course of adjustment of the range finder the main axis of this optical square is first set truly upright by the usual tilting about its longitudinal axis as previously described. This having been done, then the mirror 4 must be carefully adjusted so as to reflect the pencil of parallel rays received from the centre point of the telescope diaphragm and emerging from the object glass back again on the said course or axis so as to be refracted back again by the objective and come to focus at the centre of the diaphragm. As a result of this then an image of the luminous silvered line will be formed upon the black line which latter will appear to bisect it longitudinally. At the same time the whole field will be filled with a semi-luminous back ground of light reflected from the unsilvered surfaces of the diaphragm.

If now anything causes the right hand half of the main tube of the range finder to buckle in a vertical plane, such as hot sunshine on the top then the main axis of the right hand optical square will become tilted away from the telescope, that is the optical square will rotate about its first secondary axis (or the line pointing to the distant target) and the attached mirror 4 will now reflect the return beam upwards, consequently the return image of the silvered line as seen in the erecting telescope will be seen to drop down in the field of view of the collimating telescope as at 12 (Figure 2).

As described in specification No. 1013849, the optical square may be tilted about an axis pointing towards the distant target by turning a milled head or the like conveniently near the eye-piece.

If this milled head be now operated then the optical square is tilted back again until the image of the silvered line is again projected upon the black line, when it is clear that the optical square has been restored to perfect uprightness.

If now the other or left hand optical square is also out of upright the effect seen in the field of view of the range finder proper will be a very perceptible halving error, the image from the left hand optical square in this case will be projected lower down in the field than that from the already adjusted right hand one, and all that is necessary to restore the left hand optical square to uprightness is to tilt it about its first secondary axis until the halving error disappears, when its main axis must of necessity be again upright. This is of course done by turning round another milled head which causes the left hand optical square to tilt about an axis placed parallel to its first secondary axis, as in the case of the right hand one.

In this way the uprightness of the two optical squares may be kept easily within two minutes of error. Of course other forms of markings may be adopted for the diaphragm of the collimating telescope but I have described what seems to me to be the simplest and best form.

It will easily be surmised that the optical squares are not likely to become tilted about their secondary axis or the axis of the main tube, for it would require an exceedingly improbable torsion or spiral twist of the tube to bring that about.

So that when using a range finder for actually taking range readings, the observer can if need be, first glance into the eyepiece of the collimating telescope and by means of the right hand halving error adjuster milled head restore the right hand optical square to uprightness. He then looks into the range finder eyepiece at the distant target and eliminates any noticeable halving error by operating the left hand halving error adjuster milled head after which coincidence observations for range taking may fitly be undertaken.

It is important that the field of view of this collimating telescope should be fairly large and also that the free distance between the eye and the lenses should be as large as possible and therefore I recommend a form of eyepiece which formed the subject of my British patent application No. 9565/1918, consisting of a triple cemented achromatic lens 14 and a double cemented achromatic lens 15.

The method of fixing the mirror 4 in Figures 4 and 5 is substantially described in British patent specification 7392 of 1910 and consists in holding the mirror between flat metal pallets 16 which have free ball and socket bearings on the ends of the screws 5, 6 and 7 which are fixed adjustably through the frame, and corresponding pallets on the other side pressed onto the glass by means of the springs 17 armed with points pressing into small recesses in the pallets. The pairs of pallets being opposite to one another and free to bed themselves do not exert any distorting effects on the mirror, although holding it immovable.

I declare that what I claim is:—

1. A device for testing the adjustment of optical squares of range finders comprising in combination a collimating telescope system, a collimating mark, and a small plane reflecting mirror mounted on the framework of the said optical squares.

2. A device for testing the adjustment of optical squares of range finders comprising in combination a collimating telescope, a reflector mounted on one of said optical squares, and a plane glass diaphragm placed obliquely in the focal plane of said telescope having a horizontal mark extending from one edge to the centre of said diaphragm.

3. A device for testing the adjustment of optical squares of range finders comprising a collimating telescope, a reflector mounted on one of said optical squares and a plane glass diaphragm placed obliquely in the focal plane of said telescope having a horizontal mark extending from one edge to the centre of said diaphragm and a silvered strip extending horizontally across the other half of said diaphragm in alignment with said mark.

4. A device for testing the adjustment of optical squares of range finders comprising a collimating telescope roof prism forming an elbow reflector, a reflector mounted on one of said optical squares, and a plane glass reflecting diaphragm having two horizontal reading marks in alignment each extending across half of said diaphragm.

In witness whereof, I have hereunto signed my name this 9th day of April 1919, in the presence of two subscribing witnesses.

HAROLD DENNIS TAYLOR.

Witnesses:
GEORGE WILLIAM CURRY,
DOROTHY ADELAIDE HAZELL.